(12) United States Patent
Kim et al.

(10) Patent No.: US 7,680,062 B2
(45) Date of Patent: Mar. 16, 2010

(54) APPARATUS AND METHOD FOR CONTROLLING ABNORMAL TRAFFIC

(75) Inventors: Kwang Sik Kim, Daejeon (KR); Byeong Cheol Choi, Daejeon (KR); Dong Il Seo, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1139 days.

(21) Appl. No.: 11/292,462

(22) Filed: Dec. 1, 2005

(65) Prior Publication Data

US 2006/0120284 A1 Jun. 8, 2006

(30) Foreign Application Priority Data

Dec. 2, 2004 (KR) .................... 10-2004-0100357

(51) Int. Cl.
*H04L 1/00* (2006.01)
*H04L 12/26* (2006.01)
*G08B 23/00* (2006.01)

(52) U.S. Cl. .................... 370/252; 370/230; 726/22

(58) Field of Classification Search ............... 370/230, 370/241, 242, 252, 464–465; 709/224, 234, 709/235; 714/100; 726/13, 22, 23, 25
See application file for complete search history.

(56) References Cited

U.S. PATENT DOCUMENTS

| | | | | |
|---|---|---|---|---|
| 5,592,680 A * | 1/1997 | Utsumi et al. | .................... | 714/1 |
| 6,115,370 A * | 9/2000 | Struhsaker et al. | .......... | 370/342 |
| 6,118,774 A * | 9/2000 | Arai et al. | .................... | 370/342 |
| 6,321,338 B1 * | 11/2001 | Porras et al. | .................... | 726/25 |
| 6,725,378 B1 * | 4/2004 | Schuba et al. | .................. | 726/13 |
| 6,775,657 B1 * | 8/2004 | Baker | .......................... | 706/45 |
| 6,816,973 B1 * | 11/2004 | Gleichauf et al. | ............. | 726/13 |
| 7,174,566 B2 * | 2/2007 | Yadav | .......................... | 726/26 |
| 7,493,657 B1 * | 2/2009 | Krishnaswamy et al. | ...... | 726/22 |
| 2001/0039623 A1 * | 11/2001 | Ishikawa | .................... | 713/201 |
| 2004/0054925 A1 * | 3/2004 | Etheridge et al. | ........... | 713/201 |
| 2004/0093513 A1 * | 5/2004 | Cantrell et al. | .............. | 713/201 |
| 2004/0250124 A1 * | 12/2004 | Chesla et al. | ............... | 713/201 |

(Continued)

FOREIGN PATENT DOCUMENTS

KR 1020020058765 7/2002

(Continued)

*Primary Examiner*—Chi H Pham
*Assistant Examiner*—Warner Wong
(74) *Attorney, Agent, or Firm*—Blakely, Sokoloff, Taylor & Zafman

(57) ABSTRACT

An apparatus and method for controlling abnormal traffic are provided. The apparatus includes: a list management unit which stores a list of Internet Protocols (IPs) transmitting normal packets and, conditionally, announces that the current packet traffic is packet traffic generated by a registered IP; a channel allocation unit which allocates channels to the input packets in such a manner that a packet determined as being normal is given priority over a packet determined as being abnormal, transmits the input packets to a network node, and transmits IP information regarding the input packets that are determined as being normal; a success rate determination unit which determines a service success rate for packets received from a registered IP; and a channel number adjustment unit which transmits the predetermined command to the channel allocation unit so that the channel allocation unit can adjust the number of channels reserved for allocation to normal packets.

7 Claims, 3 Drawing Sheets

U.S. PATENT DOCUMENTS

| | | | |
|---|---|---|---|
| 2004/0250158 A1* | 12/2004 | Le Pennec et al. | 714/4 |
| 2005/0108377 A1* | 5/2005 | Lee et al. | 709/223 |
| 2007/0011741 A1* | 1/2007 | Robert et al. | 726/22 |
| 2007/0204060 A1* | 8/2007 | Higuchi et al. | 709/234 |
| 2007/0209068 A1* | 9/2007 | Ansari et al. | 726/13 |
| 2008/0134334 A1* | 6/2008 | Kim et al. | 726/23 |
| 2008/0137542 A1* | 6/2008 | Chiu | 370/242 |
| 2008/0168551 A1* | 7/2008 | Eom et al. | 726/14 |
| 2008/0286430 A1* | 11/2008 | Seltzer et al. | 426/544 |

FOREIGN PATENT DOCUMENTS

| | | |
|---|---|---|
| KR | 2003-0051929 | 6/2003 |
| KR | 1020030050307 | 6/2003 |
| KR | 1020040044209 | 5/2004 |
| KR | 10-2004-0057257 | 7/2004 |

* cited by examiner

APPARATUS AND METHOD FOR CONTROLLING ABNORMAL TRAFFIC

CROSS-REFERENCE TO RELATED PATENT APPLICATION

This application claims the benefit of Korean Patent Application No. 10-2004-0100357, filed on Dec. 2, 2005, in the Korean Intellectual Property Office, the disclosure of which is incorporated herein in its entirety by reference.

BACKGROUND OF THE INVENTION

1. Field of the Invention

The present invention relates to a network, and more particularly, to a method and apparatus for controlling abnormal traffic input to a network.

2. Description of the Related Art

Recent cyber attacks seem to aim at disrupting certain services rather than to launch attacks on a system level as often as they used to do. For example, an Internet worm launched on 25 Jan. 2003 was one of the fastest spreading denial of service (DOS) attacks ever causing massive disruption on the Internet. Nowadays, cyber attacks have become a serious threat to national security, social cohesion, and the economy more than a threat to personal privacy.

However, conventional Internet security technologies require a considerable amount of time to recover systems damaged by various Internet errors because, once an Internet worm is launched upon a system, a considerable number of packets are eliminated regardless of the types of the packets. Therefore, systems using conventional Internet security technologies take a considerable amount of time to resume their operations for normally providing various Internet services after they are damaged by Internet errors.

Techniques of monitoring and controlling traffic at Internet service provider (ISP) network access points (APs) have drawn attention from the public as a viable way to enhance the reliability and survivability of networks by safely transmitting user services from a subscriber network to a backbone network without disconnection and quickly and appropriately responding to outbreaks of Internet viruses or cyber attacks, such as preventing Internet viruses from being widespread.

Examples of Internet security solutions for providing stable Internet services include Fault Tolerant Networks (FTN) developed by the Defense Advanced Research Project Agency (DARPA) and Peakflow developed by Arbor Inc.

Peakflow measures, collects, and analyzes security-related data based on traffic analysis results provided by Cisco Netflow. In other words, Peakflow can be applied only to an environment where Cisco routers exist.

It is difficult to thoroughly examine traffic input to a network at a network node because network line speed is high at a network node. The level of security at a network node near an Internet access point (AP) is lower than the level of security of security equipment located in a subscriber network.

Unknown attacks launched upon networks have become a trend in a global network environment. When an unknown attack occurs, a network node is highly likely to determine traffic currently input to, a network as being abnormal instead of as being malicious. If all abnormal traffic is determined as being caused by malicious attacks, it must not be served.

However, all abnormal traffic is not malicious traffic, and thus, minimal services need to be performed on abnormal traffic. An abnormal traffic controlling network device is more likely to disallow transmission of normal traffic than a network device for preventing transmission of abnormal traffic. In an Internet environment, abnormal traffic may be generated as a result of a malicious attack. However, there is always a possibility that part of abnormal traffic is normal traffic. Thus, a network device must allocate part of its available system resources to abnormal traffic, so the amount of system resources available to normal traffic decreases.

In other words, services are provided even to abnormal traffic which may include normal traffic by using part of system resources reserved for normal traffic, in which case, normal traffic may not be served sufficiently. Therefore, how to efficiently serve abnormal traffic without indiscriminately preventing transmission of the abnormal traffic still remains as a major problem to be tackled.

SUMMARY OF THE INVENTION

The present invention provides an apparatus and method for controlling abnormal traffic in which the completeness of services can be guaranteed and a waste of network system resources can be prevented while efficiently controlling abnormal traffic.

According to an aspect of the present invention, there is provided an apparatus for controlling network traffic. The apparatus includes: a list management unit which stores a list of Internet Protocols (IPs) transmitting normal packets and, if an IP transmitting packets constituting current packet traffic currently input to a network is a registered IP listed in the IP list, announces that the current packet traffic is packet traffic generated by a registered IP; a channel allocation unit which determines whether packets input via the list management unit are normal or abnormal, allocates channels to the input packets in such a manner that a packet determined as being normal is given priority over a packet determined as being abnormal, adjusts a number of channels reserved for allocation to normal packets in response to a predetermined control command, transmits the input packets to a network node, and transmits IP information regarding the input packets that are determined as being normal, the predetermined control command being issued according to the level of services for normal packet traffic; a success rate determination unit which determines a service success rate for packets received from a registered IP listed in the IP list stored in the list management unit based on packet traffic information received from the list management unit and the IP information received from the channel allocation information; and a channel number adjustment unit which transmits the predetermined command to the channel allocation unit so that the channel allocation unit can adjust the number of channels reserved for allocation to normal packets based on the service success rate determined by the success rate determination unit.

If the service success rate determined by the success rate determination unit is greater than a predetermined reference value or a maximum of a predetermined range, the channel number adjustment unit transmits the command which reduces the number of channels reserved for allocation to normal packets, and if the service success rate determined by the success rate determination unit is smaller than the predetermined reference value or a minimum of the predetermined range, the channel number adjustment unit transmits the command which increases the number of channels reserved for allocation to normal packets.

The channel number adjustment unit may determine the degree to which the number of channels reserved for allocation to normal packets is to be reduced or increased based on how much the service success rate determined by the success rate determination unit is greater than the predetermined reference value or the maximum of the predetermined range or smaller than the predetermined reference value or the minimum of the predetermined range.

The channel allocation unit may perform services for abnormal packets only if the number of channels currently available is greater than the number of channels reserved for allocation to normal packets.

The list management unit may store a list of IPs transmitting damaged packets or malicious packets as a blacklist and prevents transmission of packets received from an IP listed in the blacklist.

According to another aspect of the present invention, there is provided a method of controlling network traffic. The method includes: registering a plurality of IPs transmitting normal packets to a network; detecting IP information regarding a plurality of packets constituting current packet traffic currently input to the network; allocating channels to the packets of the current packet traffic in such a manner that a packet determined as being normal is given priority over a packet determined as being abnormal, and transmitting the packets of the current packet traffic to a network node, and detecting IP information regarding the packets of the current packet traffic that are determined as being normal; determining a service success rate for the packets of the current packet traffic based on the IP information regarding all of the packets of the current packet traffic and the IP information regarding only the packets of the current packet traffic that are determined as being normal; and adjusting a number of channels reserved for allocation to normal packets based on the determined service success rate and transmitting packets to the network node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
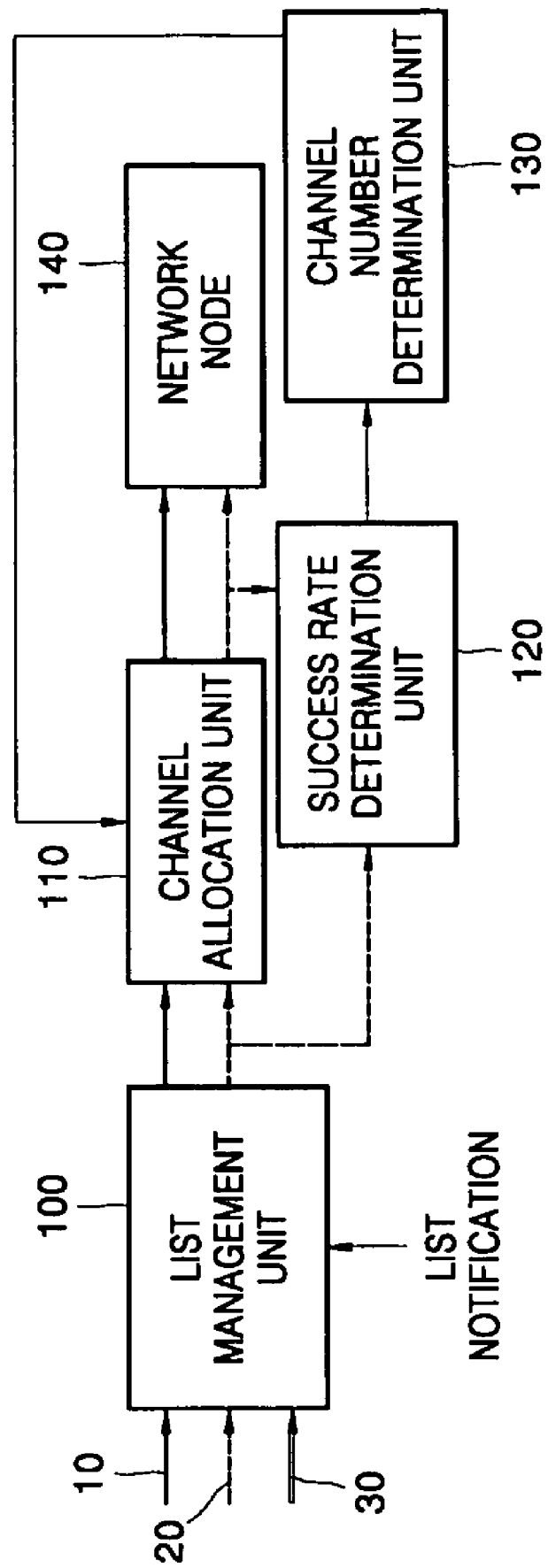
FIG. 1 is a block diagram of an apparatus for controlling abnormal traffic according to an exemplary embodiment of the present invention.

FIG. 1 is a block diagram of an apparatus for controlling abnormal traffic according to an exemplary embodiment of the present invention. Referring to FIG. 1, the apparatus controls traffic input to a network. The apparatus includes: a list management unit 100 which stores a list of Internet protocols (IPs) transmitting normal packets and determines whether an IP which transmits packets constituting current packet traffic currently input to the network are registered IPs; a channel allocation unit 110 which determines whether packets input via the list management unit 100 are normal or abnormal, adjusts the number of channels allocated to normal packets based on the determined results in response to a predetermined control command issued according to the level of services provided for normal packet traffic, transmits the input packets to a network node 140 using the adjusted result, and transmits IP information regarding the input packets determined as being normal to a success rate determination unit 120; the success rate determination unit 120 which determines a service success rate or a range of service success rates indicating how many of a plurality of packets received from an IP registered with the list management unit 100 have been successfully transmitted to the network node 140 based on packet traffic information received from the list management unit 100 and the channel allocation unit 110; and a channel number determination unit 130 which transmits the predetermined control command to the channel allocation unit 110 so that the channel allocation unit 110 is controlled to adjust the number of channels allocated to normal packets based on the service success rate or the range of service success rates determined by the success rate determination unit 120.

Figure 2:
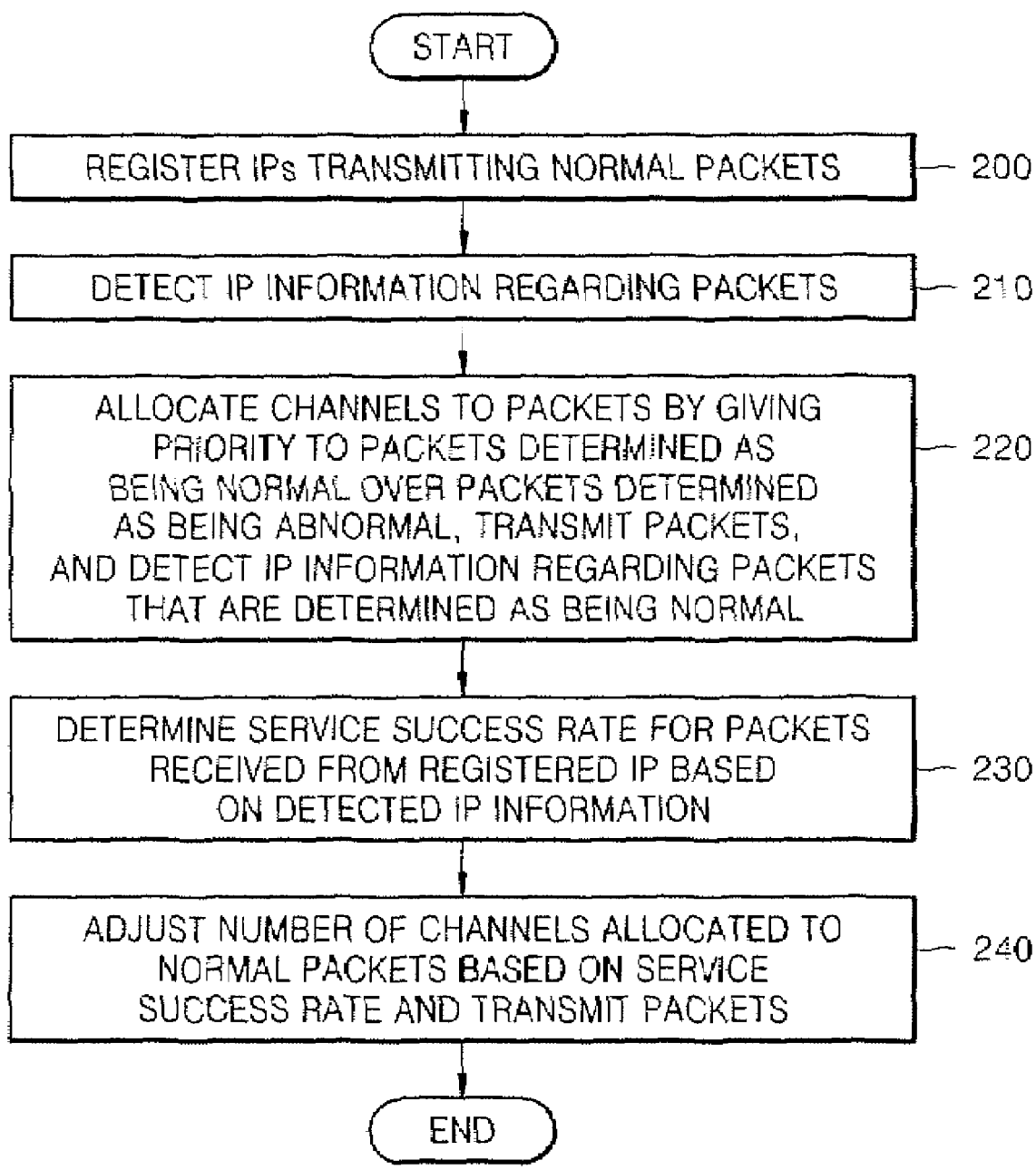
FIG. 2 is a flowchart illustrating a method of controlling abnormal traffic according to an exemplary embodiment of the present invention.

FIG. 2 is a flowchart illustrating a method of controlling abnormal traffic according to an exemplary embodiment of the present invention. Referring to FIG. 2, in operation 200, a plurality of IPs which transmit normal packets to a network are registered. In operation 210, IP information regarding a set of packets constituting current traffic currently being input to the network is detected. In operation 220, the packets are transmitted to a node of the network by allocating channels with higher priority levels to normal packets than to abnormal packets, and IP information regarding the normal packets is detected. In operation 230, a service success rate for the packets of the current packet traffic transmitted from the IP registered in operation 200 is determined based on the IP information detected in operation 210 and the IP information detected in operation 220. In operation 240, according to the service success rate, the number of channels allocated to normal packets is adjusted, and the normal packets are transmitted using the adjusted result.

The operation of a network to which the present invention can be applied will now be described.

First, flow-based traffic analysis is carried on packet traffic. A traffic analysis apparatus that carries out such flow-based traffic analysis comprises a network weakness analysis engine which takes preventive measures against Internet service errors and an attack packet analysis engine which controls abnormal traffic for reducing error event time.

Second, abnormal traffic is controlled. The controlling of abnormal traffic includes monitoring traffic through flow-based traffic analysis and appropriately handling abnormal traffic based on the monitored results.

A global information base (GIB), which is a type of database, collects packet information, carries out correlation analysis on the packet information, and determines how to respond to traffic determined as being abnormal. In addition, the GIB manages the packet information, user information, and site information. Flow-based traffic analysis results are transmitted to the list management unit 100 of the apparatus illustrated in FIG. 1.

It is assumed that the apparatus illustrated in FIG. 1 controls abnormal traffic through flow-based traffic analysis.

Referring to FIG. 2, in operation 200, the list management unit 100 receives a list of IPs of registered users or registered servers from, for example, a GIB. Packets transmitted from a registered user or a registered server are considered to be normal packets, and thus, a list of IPs of registered users or registered servers is referred to as a whitelist.

Packets input to the apparatus of FIG. 1 via the list management unit 100 may include those generated by an IP unregistered with a whitelist, those generated by an IP registered with the whitelist, and those generated by an IP that has ever transmitted damaged packets or malicious packets and thus deserves caution.

The list management unit 100 stores a list of IPs that have ever transmitted damaged packets or malicious packets as a blacklist and may disallow transmission of packets received from IPs listed in the blacklist.

A solid line arrow 10 indicates the flow of traffic that is generated by packets transmitted from IPs unlisted in the whitelist, a dotted line arrow 20 indicates the flow of traffic that is generated by packets transmitted from IPs listed in the whitelist, and a dotted line arrow 30 indicates the flow of traffic that is generated by packets transmitted from IPs listed in the blacklist and is to be abandoned. Solid line arrows between the list management unit 100 and the channel allocation unit 110 and between the channel allocation unit 110 and the network node 140 also indicate the flow of traffic generated by packets transmitted from IPs not included in the whitelist. Dotted line arrows between the list management unit 100 and the channel allocation unit 110, between the channel allocation unit 1110 and the network node 140, and between the list management unit 100 and the service rate determination unit 120 indicate the traffic flow indicated by the dotted line arrow 20.

In operation 200, the list management unit 100 receives IP information of a registered user listed in the whitelist and stores the IP information. In operation 210, the list management unit 100 detects an IP of a user or a server that has transmitted packets included in packet traffic input to a network. Thereafter, the list management unit 100 determines whether the user or the server is a registered user or server listed in the whitelist by comparing the detected IP information with IP information included in the whitelist. Only if the detected IP information is determined to be registered IP information, the list management unit 100 transmits the detected IP information to the success rate determination unit 120.

In operation 220, the channel allocation unit 110 determines whether packets input via the list management unit 100 are normal or abnormal, allocates channels to the input packets in such a manner that input packets determined as being normal are allocated channels ahead of input packets determined as being abnormal, and transmits the input packets to the network node 140. In this manner, packets are input to the network to which the present invention is applied. In addition, in operation 220, the channel allocation unit 110 also transmits IP information regarding the input packets determined as being normal to the success rate determination unit 120.

In operation 230, the success rate determination unit 120 determines a service success rate indicating how many of a plurality of packets transmitted from a registered IP listed in the whitelist have been successfully transmitted to the network node 140 based on packet information received from the list management unit 100 and packet information received from the channel allocation unit 110.

In operation 240, the channel number determination unit 130 transmits a control command to the channel allocation unit 110 so that the channel allocation unit 110 is controlled to reduce the number of channels allocated to normal packets if the service success rate determined by the success rate determination unit 120 is high and to increase the number of channels allocated to normal packets if the service success rate determined by the success rate determination unit 120 is low.

A predetermined reference value or a predetermined range of reference values may be set in advance to determine whether the service success rate determined by the success rate determination unit 120 is high or low. If the service success rate determined by the success rate determination unit 120 is high, it appears that normal packets received from a registered IP are well served, and thus, the number of channels allocated to normal packets is reduced, thereby performing better services for abnormal packets. On the other hand, if the service success rate determined by the success rate determination unit 120 is low, it appears that normal packets received from a registered IP are poorly served, and thus, the number of channels allocated to normal packets is increased, thereby performing better services for normal packets.

In order to enhance the efficiency of serving packets, the degree to which the number of channels allocated to normal packets is reduced or increased may be determined based on how much the service success rate determined by the success rate determination unit 120 is higher or lower than the predetermined reference value or how much the service success rate determined by the success rate determination unit 120 is beyond the predetermined reference value range. For this, the channel number determination unit 130 may determine the degree to which the number of channels allocated to normal packets is reduced or increased according to how much the service success rate determined by the success rate determination unit 120 is higher or lower than the predetermined reference value or how much the service success rate determined by the success rate determination unit 120 is beyond the predetermined reference value range.

The channel allocation unit 110 receives a control command from the channel number determination unit 130 in a feedback approach, adjusts a number of channels reserved for allocation in response to the received control command, and transmits packets to the network node 140 using the adjusted result.

Figure 3:
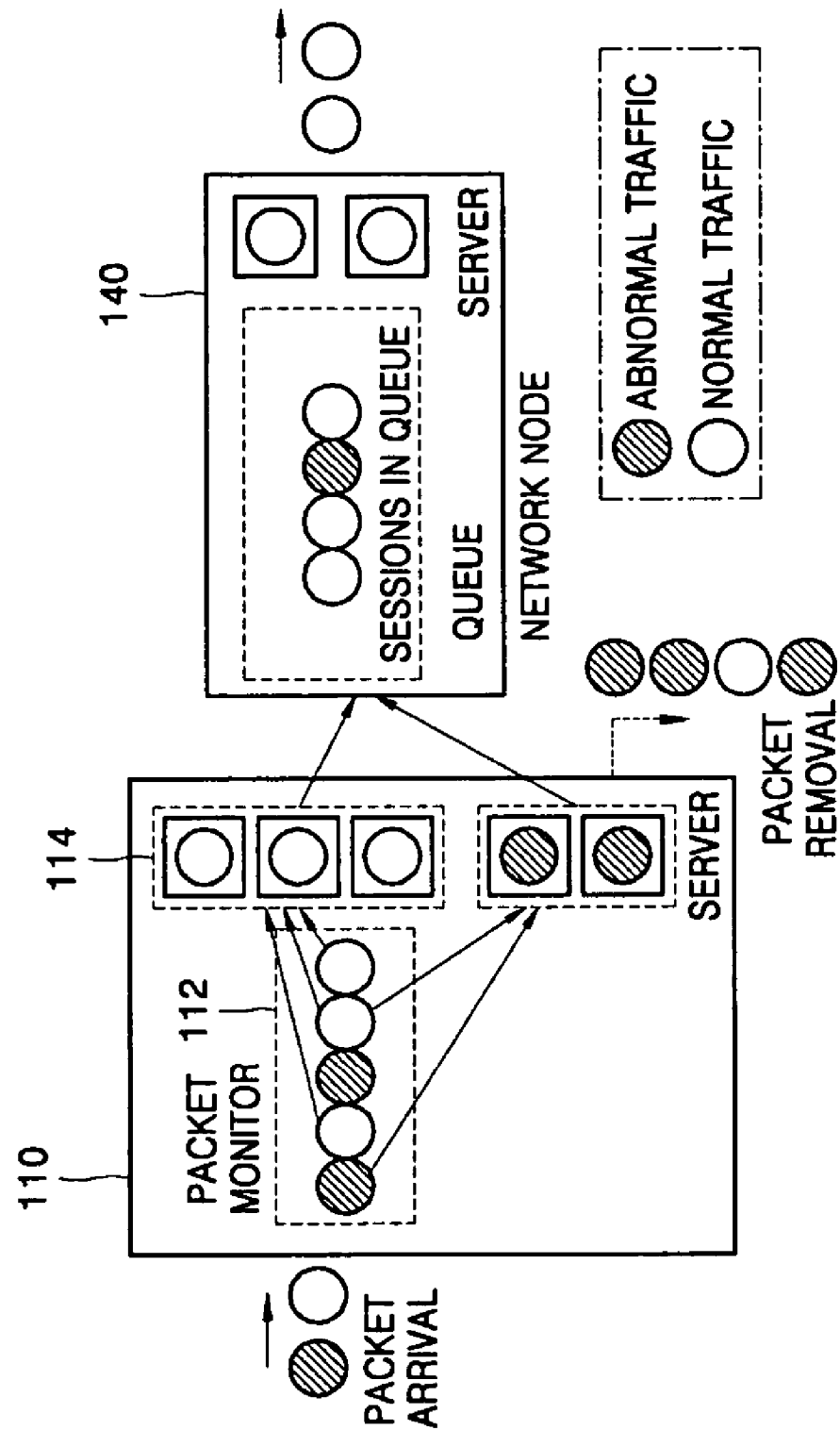
FIG. 3 is a detailed block diagram illustrating the inner structure of a channel allocation unit of the apparatus of FIG. 1 and an example of packet flow inside the channel allocation unit.

FIG. 3 is a diagram illustrating the inner structure of the channel allocation unit 110 of FIG. 1 and an example of packet flow inside the channel allocation unit 110. Referring to FIG. 3, the channel allocation unit 110 includes a packet monitor 112 and a server 114. The packet monitor 112 monitors beginning and ending portions of packet flow. Packets arriving at the channel allocation unit 110 are managed in units of packet flows. Here, the packet flows as the units of packet management may be virtual channel connections, like channels in a telephone network.

The packet monitor 112 determines whether packets input thereto are normal or abnormal. If the input packets are determined as being damaged, the packet monitor 112 determines traffic generated by the input packets as being abnormal.

If the frequency of packets with the same destination IP, the same source IP, and the same port number being input to the packet monitor 112 and the size of the packets are within corresponding respective ranges, the packet monitor 112 may determine the packets input thereto as being normal. Otherwise, however, the packet monitor 112 may determine the input packets as being abnormal. Alternatively, If the frequency of packets with the same destination IP, the same source IP, and the same port number being input to the packet monitor 112 and the size of the packets are outside the respective ranges, the packet monitor 112 may determine the input packets as being normal. Otherwise, however, the packet monitor 112 may determine the input packets as being abnormal. For example, a number of packets to be input from a certain IP to the packet monitor 112 is estimated in advance, and a ratio or a range of ratios of the estimated number of packets to be input from the certain IP to the packet monitor 112 to an estimated total number of packets input to the packet monitor 112 are determined in advance. Thereafter, if fewer packets than the determined result are received from the certain IP, the packet monitor 112 may determine the received packets as being normal. However, if even more packets than the determined result are received from the certain IP, the packet monitor 112 may determine the received packets as being abnormal.

Alternatively, if a plurality of packets having the same size are consecutively received from a certain IP, the packet monitor 112 may determine the received packets as being involved in an attack launched thereupon and thus may eliminate traffic generated by the received packets or may treat the traffic as abnormal traffic so the traffic is given a lower priority than other traffic in terms of channel allocation.

The server 114 controls abnormal traffic transmitted by the packet monitor 112 by giving lower priority to the abnormal traffic than to normal traffic. The server 114 may control the abnormal traffic by disallowing transmission of the abnormal traffic or queuing the abnormal traffic. In detail, if the number of packets determined as being abnormal is smaller than the number of channels reserved for allocation to normal packets, the packets determined as being abnormal are abandoned instead of being transmitted to the network node 140. On the other hand, the number of packets determined as being abnormal is greater than the number of channels reserved for allocation to normal packets, the packets determined as being abnormal are allocated channels and then are served.

In addition, when all of the channels of the server 114 are occupied, even packets determined as being normal are abandoned instead of being transmitted to the network node 140 because there are no channels left to serve them, as illustrated in FIG. 3.

In the manner described above, damaged packets end up low survivability, and thus, overall effective transmission rate increases.

In short, the apparatus for controlling abnormal traffic according to an exemplary embodiment of the present invention executes a security policy that provides a soft firewall function to protect normal traffic generated by an authorized user from abnormal traffic.

The channel allocation unit 110 use traffic monitoring and controlling techniques to localize outbreaks of Internet errors and enhance the survivability of a network. Accordingly, the channel allocation unit 110 can increase service success rate as much as possible even when error-causing factors continue to exist.

In the present invention, when a considerable amount of traffic is generated due to an unknown attack, normal packet traffic is given priority, and a service success rate for the normal packet traffic is determined. Thereafter, a number of channels reserved for allocation to normal packet traffic is determined based on the service success rate, thereby guaranteeing the quality of service (QoS) for normal packet traffic and the service survivability of the normal packet traffic. If the number of channels reserved for allocation to normal packet traffic increases, a number of channels reserved for allocation to abnormal packet traffic decreases, thereby reducing the service survivability of abnormal packet traffic.

The apparatus for controlling abnormal traffic according to an exemplary embodiment of the present invention may be located near an access network node, such as a digital subscriber line access multiplexer (DSLAM) in an ADSL-based subscriber network. In addition, the apparatus for controlling abnormal traffic according to an exemplary embodiment of the present invention may be a type of pre-processor and may be driven as a plug-in of a network node or a system independent from a network node.

An increasing number of unknown attacks occur often and are expected to become a greater part of our daily lives in the near future. Security equipment, such as intrusion detection systems (IDSs) and security appliances, may falsely determine traffic input to an Internet service provider (ISP) AP connected to a subscriber network as being normal or abnormal. Conventional security equipment has difficulty determining whether to allow or disallow transmission of abnormal traffic because part of abnormal traffic is normal traffic generated by authorized Internet users rather than damaged packet traffic. Therefore, when an unknown attack based on excessive traffic is launched, a network IDS may end up high false positives or negatives, in which case abnormal traffic detection results provided by conventional security equipment may be useless. In such an environment, the apparatus for controlling abnormal traffic according to an exemplary embodiment of the present invention can help a network node, such as a router, to handle abnormal traffic.

The present invention may be embodied as a software program or a hardware device using typical programming techniques, which is obvious to one of ordinary skill in the art.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily construed by one of ordinary skill in the art.

The apparatus for controlling abnormal traffic according to the present invention includes: a list management unit which stores a list of Internet Protocols (IPs) transmitting normal packets and, if an IP transmitting packets constituting current packet traffic currently input to a network is a registered IP listed in the IP list, announces that the current packet traffic is packet traffic generated by a registered IP; a channel allocation unit which determines whether packets input via the list management unit are normal or abnormal, allocates channels to the input packets in such a manner that a packet determined as being normal is given priority over a packet determined as being abnormal, adjusts a number of channels reserved for allocation to normal packets in response to a predetermined control command, transmits the input packets to a network node, and transmits IP information regarding the input packets that are determined as being normal, the predetermined control command being issued according to the level of services for normal packet traffic; a success rate determination unit which determines a service success rate for packets received from a registered IP listed in the IP list stored in the list management unit based on packet traffic information received from the list management unit and the IP information received from the channel allocation information; and a channel number adjustment unit which transmits the predetermined command to the channel allocation unit so that the channel allocation unit can adjust the number of channels reserved for allocation to normal packets based on the service success rate determined by the success rate determination unit. Therefore, the apparatus for controlling abnormal traffic according to the present invention can guarantee the survivability of a network and the reliability of Internet services by appropriately controlling abnormal traffic input to the network. In addition, even when error-causing factors continue to exist in the network, the apparatus for controlling abnormal traffic according to the present invention can guarantee the completeness of Internet services by controlling abnormal traffic. In addition, the apparatus for controlling abnormal traffic according to the present invention controls abnormal traffic rather than to indiscriminately disallow transmission of abnormal traffic and thus can provide superior traffic blocking rates and higher normal traffic transmission rates than conventional network nodes that simply prevent transmission of abnormal traffic. Moreover, the method of controlling abnormal traffic according to the present invention can provide high QoS to users through Internet infrastructure when applied to edges of a network or APs in the network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling network traffic comprising:
a list management unit which stores a list of Internet Protocols (IP) addresses transmitting normal packets and, if an IP address transmitting packets constituting current packet traffic currently input to a network utilize a registered IP address listed in the IP address list, announces that the current packet traffic is packet traffic generated by a registered IP address;
a channel allocation unit which determines whether packets input via the list management unit are normal or abnormal, allocates channels to the input packets in such a manner that a packet determined as being normal is given priority over a packet determined as being abnormal, adjusts a number of channels reserved for allocation to normal packets in response to a predetermined control command, transmits the input packets to a network node, and transmits IP information regarding the input packets that are determined as being normal, the predetermined control command being issued according to a level of services for normal packet traffic;
a success rate determination unit which determines a service success rate for packets received from a registered IP address listed in the IP address list stored in the list management unit based on packet traffic information received from the list management unit and the IP address information received from the channel allocation information; and
a channel number adjustment unit which transmits the predetermined command to the channel allocation unit so that the channel allocation unit can adjust the number of channels reserved for allocation to normal packets based on the service success rate determined by the success rate determination unit.

2. The apparatus of claim 1, wherein, if the service success rate determined by the success rate determination unit is greater than a predetermined reference value or a maximum of a predetermined range, the channel number adjustment unit transmits the command which reduces the number of channels reserved for allocation to normal packets, and if the service success rate determined by the success rate determination unit is smaller than the predetermined reference value or a minimum of the predetermined range, the channel number adjustment unit transmits the command which increases the number of channels reserved for allocation to normal packets.

3. The apparatus of claim 2, wherein the channel number adjustment unit determines the degree to which the number of channels reserved for allocation to normal packets is to be reduced or increased based on how much the service success rate determined by the success rate determination unit is greater than the predetermined reference value or the maximum of the predetermined range or smaller than the predetermined reference value or the minimum of the predetermined range.

4. The apparatus of claim 1, wherein the channel allocation unit performs services for abnormal packets only if a number of channels currently available is greater than the number of channels reserved for allocation to normal packets.

5. The apparatus of claim 1, wherein the list management unit stores a list of IP address transmitting damaged packets or malicious packets as a blacklist and prevents transmission of packets received from each IP address listed in the blacklist.

6. A method of controlling network traffic comprising:
registering a plurality of Internet Protocol (IP) address transmitting normal packets to a network;
detecting IP address information regarding a plurality of packets constituting current packet traffic currently input to the network;
allocating channels to the packets of the current packet traffic in such a manner that a packet determined as being normal is given priority over a packet determined as being abnormal, and transmitting the packets of the current packet traffic to a network node, and detecting IP address information regarding the packets of the current packet traffic that are determined as being normal;
determining a service success rate for the packets of the current packet traffic based on the IP address information regarding all of the packets of the current packet traffic and the IP address information regarding only the packets of the current packet traffic that are determined as being normal; and
adjusting a number of channels reserved for allocation to normal packets based on the determined service success rate and transmitting packets to the network node.

7. The method of claim 6, wherein, the adjustment comprising transmitting a predetermined control command so that, if the determined service success rate is greater than a predetermined reference value or a maximum of a predetermined range, the number of channels reserved for allocation to normal packets can be reduced and that, if the determined service success rate is smaller than the predetermined reference value or a minimum of the predetermined range, the number of channels reserved for allocation to normal packets can be increased, wherein the degree to which the number of channels reserved for allocation to normal packets is to be reduced or increased is determined based on how much the service success rate determined by the success rate determination unit is greater than the predetermined reference value or the maximum of the predetermined range or smaller than the predetermined reference value or the minimum of the predetermined range.

* * * * *